United States Patent [19]

Komoto et al.

[11] B 3,929,716

[45] Dec. 30, 1975

[54] EPOXY RESIN COMPOSITIONS

[75] Inventors: Hiroshi Komoto, Tsurugashima; Kaoru Ohmura, Asaka, both of Japan

[73] Assignee: Asahi Kasei Kogyo Kabushiki Kaisha, Osaka, Japan

[22] Filed: May 24, 1973

[21] Appl. No.: 363,674

[44] Published under the Trial Voluntary Protest Program on January 28, 1975 as document no. B 363,674.

[30] Foreign Application Priority Data
June 5, 1972  Japan.............................. 47-55141

[52] U.S. Cl....................... 260/37 EP; 260/47 EN
[51] Int. Cl.²......................................... C08L 63/02
[58] Field of Search.................... 260/37 EP, 47 EN

[56] References Cited
UNITED STATES PATENTS

| | | | |
|---|---|---|---|
| 3,297,608 | 1/1967 | Noshay et al............... | 260/47 EN X |
| 3,464,854 | 9/1969 | Bolger......................... | 260/37 EP X |

*Primary Examiner*—Allan Lieberman
*Assistant Examiner*—E. Suzanne Parr
*Attorney, Agent, or Firm*—Burgess, Dinklage & Sprung

[57] ABSTRACT

Novel epoxy resin compositions of epoxy resin and 1,3,6-triaminomethyl hexane or the adduct thereof with, if needed, active alumina and/or silica alumina are provided. The composition, useful for paint and adhesive agents, instantly shows superior adhesive, chemical and electrical properties even under water and at a temperature below 5°C.

15 Claims, No Drawings

EPOXY RESIN COMPOSITIONS

BACKGROUND OF THE INVENTION

Epoxy resin has been widely used for paints, adhesive agents, etc., due to its superior chemical resistance, adhesive properties and electrical properties. However, there is practically no epoxy resin which is curable under water. Therefore, for the use under water of epoxy resin, epoxy resin has been covered by film. However, even by employing this convenient method, no conventionally known epoxy resin could give satisfactory results.

On the other hand, as the ocean industry grows year by year, the development of epoxy resin curable under water is strongly demanded.

In addition, there has been practically no epoxy resin, which is curable below 5°C and possesses satisfactory physical properties. For example, U.S. Pat. No. 3,639,344 was proposed for this purpose, but the composition according to this U.S. Patent gave only insufficient and unsatisfactory strength.

SUMMARY OF THE INVENTION

The present invention relates to an epoxy resin composition comprising:
I. 100 parts by weight of epoxy resin; and
II. 1 – 200 parts by weight of 1,3,6-triaminomethyl hexane or the reaction product thereof with an adduct forming compound.

The epoxy resin composition according to the present invention can be further combined, in addition to the said amount of ingredients (I) and (II), with (III) 5 – 200 parts by weight of one, or a mixture, of active alumina and silica alumina.

DETAILED DESCRIPTION OF THE INVENTION

For the epoxy resin employed as ingredient (I) according to the present invention, any known epoxy resin can be used. (Examples of the epoxy resins are described, for instance, in U.S. Pat. No. 2,592,560 or in the book, Kuniyuki Hashimoto, "Epoxy Resin" Nikkan Kogyo Shinbunsha, 1969)

More specifically, epoxy resins having in the molecule at least two epoxy groups separated by a carbon chain optionally interrupted by an ether bond are suitable for the invention. Suitable examples of the epoxy resins are reaction products obtained by contacting a polyhydric alcohol such as glycol, glycerine and trimethylol propane; polyhydric phenol such as resorcinol, hydroquinone, catechol and phloroglycinol; and polyphenol such as 2,2-bis-(4-hydroxyphenyl)-propane, p,p'-dihydroxydiphenyl, bis-(4-hydroxyphenyl) sulfone, 2,2'-dihydroxyl,1'-dinaphthylmethane and novolak resin; with an excess of epoxide such as alkylene oxide and epihalohydrin.

Particularly preferable examples are: epoxy resin repesented by the general formula

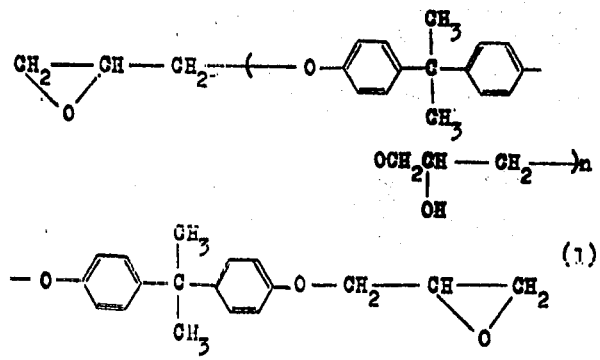

wherein $n$ represents mean value of 0 – 10 preferably 0 – 3 or novolak epoxy resin which is a reaction product of novolak resin and epichlorohydrin and which is represented by the general formula of

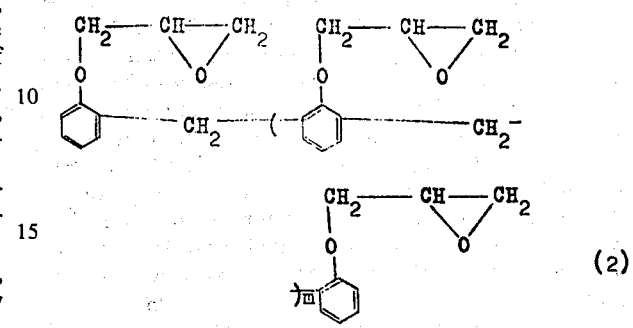

wherein $m$ represents mean value of 0 – about 5. Generally, any epoxy resin which is liquid with a melting point not more than 20°C is suitable. However, powdery epoxy resin can also be employed for the invention, preferably in such case with the use of solvent such as toluene, methylethylketone and cellosolve. Further, epoxy resin dispersed in water can also be used.

Compounds suitably used for the ingredient (II) according to the invention are 1,3,6-triaminomethyl hexane and a reaction product of 1,3,6-triaminomethyl hexane with an adduct forming compound, for example monoepoxide such as ethylene oxide, propylene oxide, octylene oxide, styrene oxide, α-pinene oxide, cyclohexane vinyl mono-oxide and glycidyl ester; di-epoxide such as butadiene dioxide, di-glycidyl ether, limonene dioxide, divinyl benzene dioxide, vinyl cyclohexane dioxide, bis(2,3-epoxy cyclopentyl) ether and 2-glycidyl phenylglycidyl ether; epoxy resins as represented by the said general formula (1) and (2), preferably epoxy resins having a softening point not more than 20°C; and vinyl compounds such as acrylonitrile, methyl methacrylate and vinyl chloride.

The amount, based on 1 mol of 1,3,6-triaminomethyl hexane, of diepoxide or epoxy resin is not more than 0.5 mol; and the amount based on 1 mol of 1,3,6-triaminomethyl hexane of mono-epoxide or vinyl compound is 1 – 4 mol.

1,3,6-Triaminomethyl hexane used in the invention can be easily obtained by hydrogenating under pressure and in the presence of hydrogenation catalyst such as Raney nickel 1,3,6-tricyano hexane obtained by electroreductive reaction of acrylonitrile. Adducts from 1,3,6-triaminomethyl hexane and adduct forming compounds, for example, acrylonitrile can be easily obtained by the reaction at an elevated temperature.

The amount of (II) is 1 – 200 parts based on 100 parts of epoxy resin, preferably 10 – 70 parts more preferably 20–70 parts. With less than 1 part, the curing speed is too slow. With more than 200 parts, workability becomes insufficient.

Parts means parts by weight in the present specification.

For the ingredient (III) according to the present invention, active alumina and silica alumina are suitable. Preferably, these compounds should be dry and possess not more than 40 % of absorbed water. In case the compound has more than 40 % of absorbed water, the adhesive strength in water or on wet substrate is decreased, and in case a dry compound is employed, no such troublesome decrease of adhesive strength is observed. As to the particle size of the ingredient (III), smaller particles with larger surface, preferably not larger than 50 mesh and having a bulk density not more than 1.0 is suitable. For the use in water, it is preferable to employ $\gamma\text{-}Al_2O_3$ or $\gamma\text{-}Al_2O_3 \cdot H_2O$ with a bulk density not more than 0.5. For active alumina, $Al_2O_3$, $Al_2O_3 \cdot H_2O$, and $Al_2O_3 \cdot 3H_2O$, especially $\gamma\text{-}Al_2O_3$, $\gamma\text{-}Al_2O_3 \cdot H_2O$, and $\gamma\text{-}Al_2O_3 \cdot 3H_2O$ are suitable. The addition of these compounds surprisingly promotes curing on the surface of the substrate under water and formation of a smooth coat on the surface of the substrate under water.

The amount of ingredient (III) is 5 – 200 parts, preferably 10 – 150 parts.

If needed in the present invention in addition to the above mentioned ingredients (I), (II) and (III), any of known fillers, reinforcing agents, additives and pigments can be employed.

Examples of fillers, reinforcing agents, additives and pigments are: coal tar, glass fiber, asbestos fiber, boron fiber, carbon fiber, cellulose, polyethylene powder, polypropylene powder, quartz powder, mineral silicates such as mica, asbestos powder, slate powder, kaolin, aluminum hydroxide, chalk powder, gypsum, calcium carbonate, antimony trioxide, bentonite, silica aerosol, lifton, barite, titanium dioxide, carbon black, graphite, and oxide compound pigments such as iron oxide or metallic powder for example aluminum powder or iron powder.

Further, any known curing agents can also be used. These include aliphatic polyamines for example diethylene triamine, triethylene tetramine, diethylamino propyl amine, hexamethylene diamine tris (dimethylaminomethyl) phenol, xylene diamine, etc.; aromatic polyamines for example metaphenylene diamine, diamino diphenyl methane, diamino diphenyl sulfone, etc.; polycarboxylic acid and anhydride thereof for example phthalic anhydride, trimellitic anhydride, pyromellitic anhydride etc.; polycarboxylic acid hydrazide; dicyano diamide, and $BF_3$-amine complex compounds.

The composition obtained according to the present invention shows superior adhesive ability on wet substrate or under water at lower temperature e.g. from 5°C to −10°C. Further, to meet the specific objectives, curing promoting agents such as phenols for example m-cresol, phenol, salicylic acid, or triphenyl phosphite, etc. can be added.

The present invention will be further illustrated by, but not limited to, the following examples.

In the Examples, parts means parts by weight, Charpy impact strength and shear adhesive strength are measured by JISK-6911 and ASTMD1002-64, respectively.

EXAMPLE 1

100 Parts of epoxy resin (bisphenol A type : epoxy equivalent 186 – 192) sold under the trademark "DER-331J" by Dow Chemical Co., and 15 parts of 1,3,6-triaminomethyl hexane were mixed and coated on steel sheet, and left to stand for 2 hours to obtain a completely hardened laminate. The properties of the thus obtained laminate were as follows.

| | |
|---|---|
| Charpy impact strength | 5(kg cm/cm²) |
| Shear adhesive strength | 170(kg/cm²) |
| Flexural strength ( < 180°, φ2mm) | pass (thickness of laminate: 50 μ) |

EXAMPLE 2

27.0 parts of epoxy resin (bisphenol A type: epoxy equivalent 184 – 194) sold under the trademark "Epikote" 828 by Shell Chemical Co., 11.5 parts of epoxy resin (polyglycol type: epoxy equivalent 305 – 335) sold under trademark of "DER-732" by Dow Chemical Co., 31.2 parts of titanium dioxide, 0.14 part of polyoxyethylene alkyl phenol ether type emulsifier (sold under trademark "Neugen EA 137" by Daiichi Kogyo Seiyaku Co.), 0.14 parts of polyoxyethylene polyoxypropylene condensate type emulsifier (sold under trademark of "EPAN-785" by Daiichi Kogyo Seiyaku Co.), 0.14 part of polyoxyethylene nonyl phenol ether type emulsifier (sold under trademark of "Neugen EA 50" by Daiichi Kogyo Seiyaku Co.) and 0.5 part by weight of defoaming agent (which is sold under trademark of "Silicone KM 73" by Shinetsu Chemical Co.) were blended by a kneader and then titanium dioxide was thoroughly dispersed by a rolling mill to obtain a pigment paste.

To 70.89 parts of thus obtained pigment paste heated at 50°C, 29.11 parts of water heated at 50°C was added while being throughly stirred by a high speed mixer (or homogenizor) to obtain an emulsion type epoxy resin containing titanium dioxide.

Into thus obtained 100 parts of oil-in-water type epoxy resin dispersion, 5 parts of 1,3,6-triaminomethyl hexane was blended. Compatibility at the time of blending was favorable. Then, the thus obtained mixture was coated on a tin plate sheet by using a 10 mm-doctor blade and the laminate thus formed was satisfactory. The sample was left to stand for 7 days at room temperature. Testing for curing by JIS-K-5400 indicated perfect curing was obtained. Further, the sample after JIS-K-5400 testing was immersed in water at room temperature for 30 days to test water proof properties which were also favorable.

EXAMPLE 3

100 Parts of epoxy resin (bisphenol A type containing 20 weight % of butyl glycidyl ether: epoxy equivalent 170 – 180) sold under trademark "DER-335J" by Dow Chemical Co. and 17 parts of 1,3,6-triaminomethyl hexane were mixed, adhered at 0°C on a stainless steel sheet with a size of 3 × 3 cm² and then left to stand for 1 week. Tensile adhesive strength was 110 kg/cm².

EXAMPLE 4

100 Parts of epoxy resin DER-331J as represented in Example 1, 7.5 parts of 1,3,6-triaminomethyl hexane, 10 parts of N-ethyl hexamethylene diamine and 50 parts of active alumina with a bulk density of 0.20 mainly consisting of $\gamma\text{-}Al_2O_3 \cdot H_2O$ were mixed and coated on steel sheet under water at 20°C, and left to stand for 5.5 hours to obtain completely hardened laminate. The properties of thus obtained laminate were as follows.

| | |
|---|---|
| Charpy impact strength | 5 (kg cm/cm²) |
| Shear adhesive strength | 170 (kg/cm²) |

EXAMPLE 5

100 Parts epoxy resin, DER-331J as represented in Example 1, 42.7 parts of adduct obtained from 34.6 parts of 1,3,6-triaminomethyl hexane and 46 parts of glycidyl ester of 2,2-dimethyl octanoic acid and 50 parts of active alumina with the bulk density of 0.30 and mainly consisting of $\gamma$-$Al_2O_3$ were treated as shown in Example 4 and left to stand for 5 hours to obtain completely hardened laminate. The properties of thus obtained laminate were as follows.

| | |
|---|---|
| Charpy impact strength | 7 (kg cm/cm$^2$) |
| Shear adhesive strength | 200 (kg/cm$^2$) |

EXAMPLE 6

100 Parts of epoxy resin DER-331J as represented in Example 1, 15 parts of 1,3,6-triaminomethyl hexane, 50 parts of anhydrous calcium sulphate and 30 parts of silica alumina with a bulk density of 0.35 were mixed and coated as in Example 4. After 6 hours, complete curing was achieved. The properties of the obtained laminate were as follows.

| | |
|---|---|
| Charpy impact strength | 6 (kg cm/cm$^2$) |
| Shear adhesive strength | 180 (kg/cm$^2$) |

EXAMPLE 7

100 Parts of epoxy resin DER-331J as represented in Example 1, 38.3 parts of adduct obtained from 34.6 parts of 1,3,6-triaminomethyl hexane and 37.8 parts of epoxy resin DER-331J as represented in Example 1, 100 parts of active alumina with a bulk density of 0.46 and mainly consisting of $\gamma$-$Al_2O_3 \cdot H_2O$ and 2 parts of xylene-methyl isobutyl ketone-cellosolve (1:1:1) were mixed and coated as in Example 4. After 6 hours, complete curing was attained to obtain smooth laminate. The properties of the laminate were as follows.

| | |
|---|---|
| Charpy impact strength | 7 (kg cm/cm$^2$) |
| Shear adhesive strength | 200 (kg/cm$^2$) |

EXAMPLE 8

50 Parts of epoxy resin DER-331J as represented in Example 1, 50 parts of coal tar, 17.3 parts of adduct obtained from 17.3 parts of 1,3,6-triaminomethyl hexane and 8.8 parts of ethylene oxide and 50 parts of active alumina with a bulk density of 0.40 and mainly consisting of $\gamma$-$Al_2O_3 \cdot 3H_2O$ were mixed, coated under water at 20°C on steel sheet and left to stand for 6 hours to obtain complete curing. The properties of the laminate were as follows.

| | |
|---|---|
| Charpy impact strength | 3 (kg cm/cm$^2$) |
| Shear adhesive strength | 150 (kg/cm$^2$) |

EXAMPLE 9

100 Parts of epoxy resin DER-331J as represented in Example 1, 15 parts of 1,3,6-triaminomethyl hexane, 50 parts of active alumina with the bulk density of 0.30 and mainly consisting of $\gamma$-$Al_2O_3$ and 20 parts of water were mixed, coated on steel and left to stand at room temperature for 1.5 hours to obtain complete curing. The properties of the laminate were as follows.

| | |
|---|---|
| Charpy impact strength | 7 (kg cm/cm$^2$) |
| Shear adhesive strength | 220 (kg/cm$^2$) |

CONTROL 1

Known typical curing agents were treated as in Example 9 to show comparison of curing times as described in Table 1.

| epoxy resin | Curing Agent | Active alumina ($\gamma$-$Al_2O_3$) (bulk density = 0.30) | water | curing time | Charpy impact strength kg cm/cm$^2$ | Shear adhesive strength kg/cm$^2$ |
|---|---|---|---|---|---|---|
| "DER-331J" 100 parts | Tris(dimethyl-aminoethyl) phenol 20 parts | 50 parts | 20 parts | 2 days | 6 | 130 |
| "DER-331J" 100 parts | acetyl imidazole 10 parts | 50 parts | 20 parts | 1 day | 5 | 100 |

EXAMPLE 10

60 Parts of epoxy resin DER-331J as represented in Example 1, 40 parts of epoxy resin (bisphenol A type: epoxy equivalent 475 – 575) by Dow Chemical Co. sold under trademark of "DER-661J", 10 parts of 1,3,6-triaminomethyl hexane, 50 parts of active alumina with the bulk density of 0.46 and mainly consisting of $\gamma$-$Al_2O_3$, 20 parts of glass fiber powder and 2 parts of xylene-methylisobutyl ketone-cellosolve (1:1:1) were mixed and coated as in Example 4. After 3 hours, complete curing was attained to obtain smooth laminate. The properties of thus obtained laminate were as follows.

| | |
|---|---|
| Charpy impact strength | 8 (kg cm/cm$^2$) |
| Shear adhesive strength | 180 (kg/cm$^2$) |

EXAMPLE 11

100 Parts of epoxy resin (Novolak type: epoxy equivalent 172 – 179) sold under trademark of "DEN-431", 63 parts of the adduct obtained by the reaction of 40 parts of 1,3,6-triaminomethyl hexane and 36.7 parts of acrylonitrile, and 50 parts of active alumina with the bulk density of 0.40 and mainly consisting of $\gamma$-$Al_2O_3$ · $H_2O$ were mixed and coated as in Example 4. After 5 hours, the complete curing was obtained. The properties of thus obtained laminate was as follows.

| | |
|---|---|
| Charpy impact strength | 7 (kg cm/cm$^2$) |
| Shear adhesive strength | 190 (kg/cm$^2$) |

EXAMPLE 12

15 Parts of 1,3,6-triaminomethyl hexane, 100 parts of epoxy resin DER-331J as represented in Example 1 and 100 parts of active alumina with the bulk density of 0.40 and mainly consisting of $\gamma$-$Al_2O_3$ were mixed, coated on a concrete sheet (30 × 30 × 6 cm) left to stand under water for 1 day; iron plate welded with nut at the center of the plate (5 × 5 × 0.4 cm) was bonded thereto and then covered with wet cloth, and left to stand at room temperature. Tensile adhesive strength after 4 day was above 13 kg/cm$^2$ and the material breaking occurred.

EXAMPLE 13

The same procedure as in Example 12 was followed, using 100 parts of epoxy resin DER-331J as represented in Example 1, 36.9 parts of adduct obtained from 34.6 parts of 1,3,6-triaminomethyl hexane and 21.6 parts of acrylonitrile, and 120 parts of active alumina with the bulk density of 0.85 and mainly consisting of $\gamma$-$Al_2O_3$. Tensile adhesive strength after 1 day was above 12 kg/cm$^2$ and the material breaking occurred.

EXAMPLE 14

The same procedure as in Example 12 was followed, using 100 parts of epoxy resin DER-331J as represented in Example 1, 31 parts of adduct obtained from 34.6 parts of 1,3,6-triaminomethyl hexane and 24 parts of styrene oxide, and 20 parts of active alumina with the bulk density of 0.09 and mainly consisting of $\gamma$-$Al_2O_3$ · $H_2O$. Tensile adhesive strength after 1 day was above 15 kg/cm$^2$ and the material breaking occurred.

EXAMPLE 15

The same procedure as in Example 12 was followed, using mixture of 100 parts of epoxy resin DER-331J as represented in Example 1, and powder curing agent of 25.2 parts of adduct obtained from 34.6 parts of 1,3,6-triaminomethyl hexane and 13 parts of di-glycidyl ether, which adduct was being adhered to 100 parts of active alumina with the bulk density of 0.40 and mainly consisting of $\gamma$-$Al_2O_3$. Tensile adhesive strength after 1 day was above 13 kg/cm$^2$ and the material breaking occurred.

EXAMPLE 16

100 Parts of epoxy resin DER-331J as represented in Example 1, 42.7 parts of adduct obtained from 34.6 parts of 1,3,6-triaminomethyl hexane and 46 parts of glycidyl ester of 2,2-dimethyl octanoic acid, and 30 parts of active alumina with the bulk density of 0.10 and mainly consisting of $\gamma$-$Al_2O_3$ · $H_2O$ were mixed; coated on a concrete sheet (30 × 30 × 6 cm) left to stand under water for 1 day; iron plate welded with nut at the center of the plate (5 × 5 × 0.4 cm) was bonded hereto; and allowed to stand under water at 25°C. Tensile adhesive strength after 1 day was above 11.5 kg/cm$^2$ and the material breaking occurred.

EXAMPLE 17

100 Parts of epoxy resin DER-331J as represented in Example 1, 152 parts of adduct obtained from 34.6 parts of 1,3,6-triaminomethyl hexane and 138 parts of glycidyl ester of 2,2-dimethyl octanoic acid, 100 parts of coal tar and 10 parts of m-cresol were mixed and left to stand at room temperature. Curing was completed in 30 minutes and flexible cured product having hardness of 60 (by JIS A) was obtained.

EXAMPLE 18

The same procedure as in Example 1 was followed, using 100 parts of epoxy resin DER-331J as represented in Example 1 and 38.2 parts of adduct obtained from 34.6 parts of 1,3,6-triaminomethyl hexane and 23.2 parts of propylene oxide. Curing was completed in 3 hours. The properties of thus obtained laminate was as follows.

| | |
|---|---|
| Charpy impact strength | 6 (kg cm/cm$^2$) |
| Shear adhesive strength | 170 (kg/cm$^2$) |
| Flexural strength ( < 180°, $\phi$2mm) | pass (thickness of laminate; 50 $\mu$) |

EXAMPLE 19

The same procedure was followed as in Example 1, using 100 parts of epoxy resin DER-661J (bisphenol A type; epoxy equivalent 474 - 575) by Dow Chemical Co., 50 parts of xylene-methyl isobutyl ketone-cellosolve (1:1:1) and 12 parts of adduct obtained from 34.6 parts of 1,3,6-triaminomethyl hexane and 8.6 parts of acrylonitrile. Curing was completed in 3.5 hours. The properties of the resulting laminate were as follows.

| | |
|---|---|
| Charpy impact strength | 7 (kg cm/cm$^2$) |
| Shear adhesive strength | 180 (kg/cm$^2$) |
| Flexural strength ( < 180°, $\phi$2mm) | pass (thickness of laminate: 50 $\mu$) |

EXAMPLE 20

The same procedure as in Example 1 was followed, using 100 parts of epoxy resin "DER-334J" (bisphenol A type containing 11 weight % of butyl glycidyl ether: epoxy equivalent 178 - 186) by Dow Chemical Co., and 39.8 parts of adduct obtained from 34.6 parts of 1,3,6-triaminomethyl hexane and 37.8 parts of epoxy resin "DER-331J" as represented in Example 1. Curing was completed in 3 hours. The properties of the thus obtained laminate were as follows.

| | |
|---|---|
| Charpy impact strength | 7 (kg cm/cm$^2$) |
| Shear adhesive strength | 200 (kg/cm$^2$) |
| Flexural strength ( < 180°, $\phi$2mm) | pass (thickness of laminate: 50 $\mu$) |

What is claimed is:
1. An epoxy resin composition comprising:
    I. 100 parts by weight of an epoxy resin having at least two epoxy groups in the molecule; and

II. 1–200 parts by weight of 1,3,6-triaminomethyl hexane or the reaction product thereof with an adduct forming compound selected from the group consisting of
   a. a diepoxide or a glycidyl epoxy resin in up to about 0.5 times the molar amount of the triaminomethyl hexane, and
   b. a monoepoxide or a vinyl compound in about 1 to 4 times the molar amount of the triaminomethyl hexane.

2. An epoxy resin composition according to claim 1, further comprising:
III. 5–200 parts by weight of one of active alumina, silica alumina or a mixture of active alumina and silica alumina.

3. The epoxy resin composition according to claim 1, wherein the amount of (I) is 100 parts and the amount of (II) is 20 – 70 parts.

4. The epoxy resin composition according to claim 1, wherein (II) is the reaction product with the adduct forming compound of a diepoxide or glycidyl epoxy resin.

5. The epoxy resin composition according to claim 1, wherein (II) is the reaction product with the adduct forming compound of a mono-epoxide or vinyl compound.

6. The epoxy resin composition according to claim 1, wherein the epoxy resin (I) is a glycidyl ether resin of at least one compound selected from the group consisting of bisphenol A, biscresol A and novolak.

7. The epoxy resin composition according to claim 2, wherein the amount of (I) is 100 parts, and amount of (II) is 10 – 70 parts and the amount of (III) is 10 – 150 parts.

8. The epoxy resin composition according to claim 2, wherein active alumina is one compound selected from the group consisting of $\gamma$-Al$_2$O$_3$, $\gamma$-Al$_2$O$_3$·H$_2$O and $\gamma$-Al$_2$O$_3$·3H$_2$O and the mixture thereof.

9. The epoxy resin composition according to claim 2, wherein the bulk density of active alumina or silica alumina is not more that 1.0.

10. The epoxy resin composition according to claim 2, wherein (II) is the reaction product with an adduct forming compound selected from the group consisting of a diepoxide or a glycidyl epoxy resin.

11. The epoxy resin composition according to claim 2, wherein (II) is the reaction product with a adduct forming compound selected from the group consisting of a mono-epoxide or a vinyl compound.

12. The epoxy resin composition according to claim 2, wherein the epoxy resin (I) is a glycidyl ether resin of at least one compound selected from the group consisting of bisphenol A, biscresol A and novolak.

13. The epoxy resin composition according to claim 2, wherein active alumina is one compound selected from the group consisting of $\gamma$-Al$_2$O$_3$ or $\gamma$-Al$_2$O$_3$·H$_2$O.

14. The epoxy resin composition according to claim 2, wherein the bulk density of active alumina or silica alumina is not more than 0.5.

15. The epoxy resin composition according to claim 1, wherein (II) is the reaction product with a vinyl adduct forming compound selected from the group consisting of a nitrile, an acrylate or a halide.

* * * * *